United States Patent
Fellmeth et al.

(10) Patent No.: US 9,394,898 B2
(45) Date of Patent: *Jul. 19, 2016

(54) SPRING ELEMENT AND CORRESPONDING PISTON PUMP FOR DELIVERING FLUIDS

(75) Inventors: Reiner Fellmeth, Besigheim (DE); Juergen Haecker, Schwieberdingen (DE); Oliver Gaertner, Abstatt (DE); Heiko Jahn, Tamm (DE); Marc Zimmermann, Sonthofen (DE); Harald Hermann, Friolzheim (DE); Rolf Stotz, Vaihingen (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

This patent is subject to a terminal disclaimer.

(21) Appl. No.: 13/978,808

(22) PCT Filed: Nov. 22, 2011

(86) PCT No.: PCT/EP2011/070687
§ 371 (c)(1),
(2), (4) Date: Oct. 17, 2013

(87) PCT Pub. No.: WO2012/097901
PCT Pub. Date: Jul. 26, 2012

(65) Prior Publication Data
US 2014/0030125 A1    Jan. 30, 2014

(30) Foreign Application Priority Data
Jan. 21, 2011    (DE) .......................... 10 2011 002 982

(51) Int. Cl.
*F04B 49/22*    (2006.01)
*F04B 53/10*    (2006.01)
(Continued)

(52) U.S. Cl.
CPC ............. *F04B 49/225* (2013.01); *B60T 8/4031* (2013.01); *B60T 8/4068* (2013.01); *F04B 1/0404* (2013.01);
(Continued)

(58) Field of Classification Search
CPC .. F04B 53/102; F04B 53/103; F04B 53/1032; F04B 53/1035; F04B 53/1085; F04B 49/22; F04B 23/02; F04B 41/02; F04B 39/0055; F04B 11/0091; F04B 1/0404; F04B 39/10; F04B 49/225; F04B 2205/17; F04B 2205/171; F04B 2205/172; F04B 53/10; F04B 53/1077; F16K 15/044; F16K 15/046; F16K 17/046; F16K 17/0493; F16K 47/08; G05D 7/012; B60T 8/40; B60T 8/4031; B60T 8/4068
USPC ......... 417/412, 471, 479, 545, 546, 549, 554, 417/566; 137/112, 512.3, 516.15
See application file for complete search history.

(56) References Cited

U.S. PATENT DOCUMENTS

| 5,241,984 A | 9/1993 | Onjohji et al. |
| 5,570,720 A | 11/1996 | Riis |

(Continued)

FOREIGN PATENT DOCUMENTS

| DE | 102 29 201 A1 | 1/2003 |
| DE | 10 2008 026 723 A1 | 12/2009 |

(Continued)

OTHER PUBLICATIONS

International Search Report corresponding to PCT Application No. PCT/EP2011/070687, mailed Feb. 21, 2012 (German and English language document) (7 pages).

*Primary Examiner* — Devon Kramer
*Assistant Examiner* — Chirag Jariwala
(74) *Attorney, Agent, or Firm* — Maginot, Moore & Beck LLP

(57) ABSTRACT

A spring element includes a disc-shaped basic body, in which at least one spring bridge is inserted. The basic body has at least one dynamic throttle point to throttle a fluid flow. The basic body has a resilient configuration in a region of the at least one throttle point. Accordingly, an opening cross section of the at least one throttle point is configured to be set variably depending on a pressure difference.

10 Claims, 2 Drawing Sheets

(51) Int. Cl.
  *F16K 15/04* (2006.01)
  *F16K 17/04* (2006.01)
  *G05D 7/01* (2006.01)
  *B60T 8/40* (2006.01)
  *F04B 1/04* (2006.01)
  *F04B 11/00* (2006.01)
  *F04B 39/10* (2006.01)

(52) U.S. Cl.
  CPC ......... *F04B 11/0033* (2013.01); *F04B 11/0091* (2013.01); *F04B 39/10* (2013.01); *F04B 53/10* (2013.01); *F04B 53/1077* (2013.01); *F16K 15/046* (2013.01); *F16K 17/0493* (2013.01); *G05D 7/012* (2013.01); *F04B 2205/172* (2013.01)

(56) References Cited

U.S. PATENT DOCUMENTS

| | | | |
|---|---|---|---|
| 2004/0177884 A1* | 9/2004 | Konishi | F02M 37/0029 137/540 |
| 2004/0234400 A1 | 11/2004 | Schepp et al. | |
| 2006/0108007 A1 | 5/2006 | Etheridge et al. | |
| 2008/0029165 A1 | 2/2008 | Beck | |
| 2008/0029939 A1* | 2/2008 | Beck | B60G 17/044 267/64.17 |
| 2008/0252191 A1* | 10/2008 | Kim | F25D 23/02 312/405.1 |
| 2008/0317618 A1* | 12/2008 | Kim | B60T 8/4031 417/540 |

FOREIGN PATENT DOCUMENTS

| | | |
|---|---|---|
| JP | 36-22630 Y | 8/1961 |
| JP | 46-36941 B | 10/1971 |
| JP | 49-42091 B1 | 11/1974 |
| JP | 55-100756 U | 1/1979 |
| JP | 55-100756 U | 7/1980 |
| JP | 1-65949 U | 4/1989 |
| JP | 2-277978 A | 11/1990 |
| JP | 2000-45897 A | 2/2000 |
| JP | 2004-301120 A | 10/2004 |
| JP | 2004-532957 A | 10/2004 |
| JP | 2011-7254 A | 1/2011 |
| WO | 03/004872 A1 | 1/2003 |

* cited by examiner

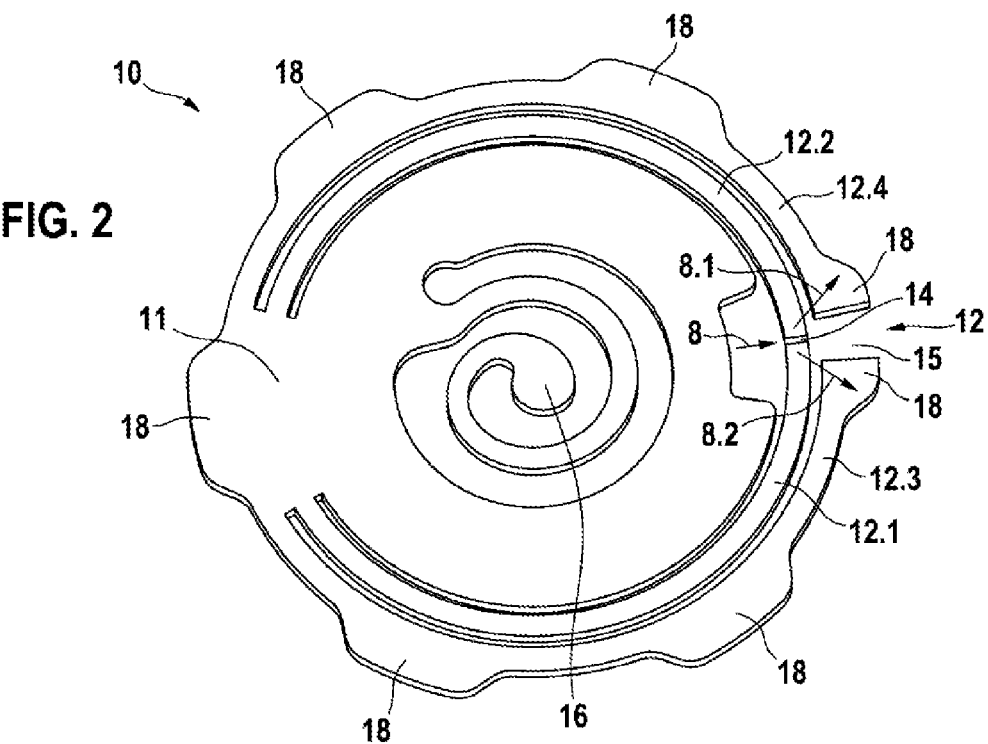
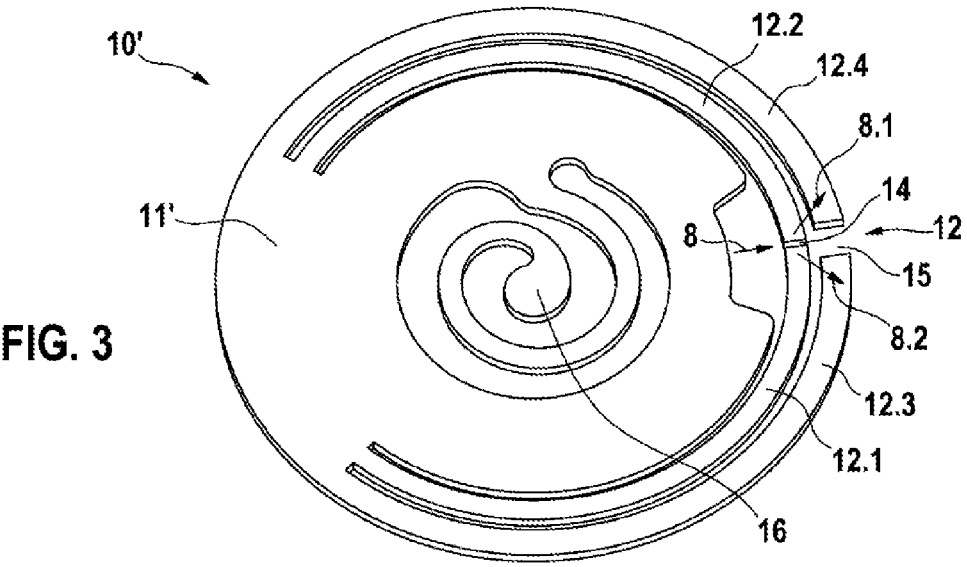

SPRING ELEMENT AND CORRESPONDING PISTON PUMP FOR DELIVERING FLUIDS

This application is a 35 U.S.C. §371 National Stage Application of PCT/EP2011/070687, filed on Nov. 22, 2011, which claims the benefit of priority to Serial No. DE 10 2011 002 982.6, filed on Jan. 21, 2011 in Germany, the disclosures of which are incorporated herein by reference in their entirety.

BACKGROUND

The disclosure starts from a spring element according to the generic type described below. In addition, the present disclosure relates to a piston pump for delivering fluids having such a spring element.

Piston pumps are known from the prior art in various embodiments. For example, radial piston pumps comprising a plurality of pump elements for delivering pressure media are frequently used in vehicle brake systems, in which pumps at least one piston can be moved in a reciprocating manner by means of a cam. These so-called pump elements typically consist of a piston, a piston running surface frequently in the form of a cylinder, inlet and outlet valves, and sealing elements. The valves are used to control the fluid during the pumping movement of the piston. The inlet valve serves here to prevent the fluid from flowing back into the suction chamber during the compression phase, while the outlet valve prevents the fluid from flowing back from the pressure side into the interior of the pump. These valves are typically in the form of spring-loaded ball valves, the outflow channel for the outlet valve being formed by a so-called outlet valve cover and the pump cylinder, and the outlet valve being accommodated in the outlet valve cover. A constant throttling device is optionally integrated in the outflow channel.

For example, a piston pump for regulating the brake pressure in a hydraulic vehicle brake system is described in the published patent application DE 102 29 201 A1. The piston pump described comprises a pump housing, a pump piston mounted displaceably in the pump housing, an inlet valve, an outlet valve and a compression chamber arranged between the inlet valve and the outlet valve, which compression chamber is enlarged during a suction stroke of the pump piston and is reduced in size during a pressure stroke of the pump piston. A pressure chamber and a flexible wall dividing the pressure chamber from an opposing chamber are provided downstream of the outlet valve, a pressure in the pressure chamber acting upon the flexible wall and the flexible wall comprising an elastically resilient membrane mounted in an elastically yielding body. The outlet valve comprises a valve seat, a closing body and a closing spring which biases the closing body against the valve seat, which is provided in a fixed manner in the housing. The closing spring is implemented in the form of a leaf spring and bears with one end against the closing body and with another end against a body fixed to the housing. At least one opening is provided in the closing spring, which opening is preferably dimensioned sufficiently large that it has practically no throttling effect on the pressure medium, or sufficiently small that it has a constant throttling effect on the medium flowing through it.

SUMMARY

In comparison to the foregoing, the spring element according to the disclosure having the features described below, and an associated piston pump having the features described below with such a spring element, have the advantage that a basic body of the spring element behaves dynamically with rising pressure difference. This has the result that an opening cross section of at least one throttle point is adjusted variably as a function of the pressure difference.

The essence of the present disclosure is that the spring element according to the disclosure combines the function of a closing spring for a closing element of a valve with the function of a throttle device for dynamically throttling a fluid flow. In this case the closing spring function, in conjunction with a closing body which may be configured, for example, as a ball, a cap or in another form, controls the opening pressure of a valve, for example an outlet valve, which separates a compression chamber of a piston pump from the high pressure side of the associated system. In order to implement the throttle function, the basic body is of resilient configuration in the region of the throttle point, so that the throttle device behaves dynamically as the pressure difference increases. In the spring element according to the disclosure, the combination of the two functions is preferably implemented in that a first spring effect of the spring element for the closing spring function acts substantially perpendicularly to a second spring effect of the spring element for the throttle function. Preferably, the first spring effect of the spring element acts axially and the second spring effect of the spring element acts radially.

The spring element according to the disclosure is configured in such a way that it can advantageously adjust or open the at least one throttle point resiliently in the event of deviations such as overpressures at low temperatures or a relatively high volume flow. The dynamic throttle function of the spring element operates a throttling effect which varies depending on pressure. For example, at relatively high pressures spring arms of the throttle device bend open and the throttle point grows larger. This enlargement of the throttle point minimizes the throttling effect. That is to say that a high throttling effect is present at low pressures and that the throttling effect is reduced at relatively high pressures. Through the high throttling effect at low pressures the pressure in the outlet valve cover can advantageously be maintained as long as possible. In this way a throttling effect can be produced by a volume pot and/or an accumulator and the pumping function can be further improved. For example, a raised internal pressure in a piston pump, and resulting damage to components, can be avoided. A cost-optimized configuration of components at the same pressure level can therefore be achieved. In "normal operation", within the linear behavior of the fluid, fluid flows through the throttle point. If viscosity and therefore flow resistance increase as a result of temperature change, the cross section of the throttle point is slightly enlarged resiliently. Through a defined outflow direction on one side of the throttle device, the closing body of the outlet valve of the piston pump can be indexed to a preferred position which positively influences the noise behavior of the piston pump.

Embodiments of the spring element according to the disclosure, especially for a piston pump, include a disk-shaped basic body in which at least one spring member is formed. According to the disclosure, the basic body includes at least one dynamic throttle point for throttling a fluid flow, the basic body being of resilient configuration in the region of the at least one throttle point, so that the opening cross section of the at least one throttle point is variably adjustable as a function of a pressure difference.

The piston pump for delivering fluids according to the disclosure comprises a piston, a cylinder element and a pressure chamber which is arranged between an inlet valve and an outlet valve and is closed by a cover, the outlet valve including a closing element which is movable against the force of a spring element according to the disclosure, and means for throttling the fluid flow which are integrated in the spring element, being provided downstream of the outlet valve in the fluid flow. The piston pump according to the disclosure can be used, for example, for delivering pressure media in a vehicle brake system.

By virtue of the resilient basic body, which has an outflow channel at the throttle point, embodiments of the spring element according to the disclosure make it possible for the outflow channel to widen in the event of a high-viscosity state of the fluid, so that a practically constant pressure difference is established at the throttle device. As a result of the dynamic throttle function according to the disclosure, both the drive power and the stress on the power-transmitting individual parts such as bearings, piston, high-pressure sealing rings, etc., are reduced. Through the shaping of the basic body, the throttle point and the spring member, the throttling and/or closing behavior can be adapted to the pumping function. Embodiments of the present disclosure therefore make possible an improved quality of the fluid system in which they are utilized. As a further advantage, clogging of the throttle point can advantageously be prevented by the dynamic behavior of the throttle function. With appropriate configuration, this can be exploited to save cost in future applications. The spring element according to the disclosure can be used not only in conjunction with a piston pump but also for other assemblies of the fluid system.

The measures and developments listed in the description below make possible advantageous improvements of the spring element specified in the below description and of the piston pump for delivering fluids specified in the below description.

It is especially advantageous that the basic body has in the region of the at least one throttle point at least one spring arm which determines the opening cross section, and which adjusts the opening cross section of the at least one throttle point as a function of the pressure difference. The at least one throttle point has, for example, a minimum opening cross section and/or a maximum opening cross section independent of the pressure difference. This has the result that, in the unloaded state, the throttle point has an outflow channel with a predefined minimum opening cross section. Additionally or alternatively, the maximum cross section of the outflow channel of the throttle point may be limited, for example by a stop, in the loaded state. The minimum opening cross section of the at least one throttle point may advantageously be optimized for a volume flow within a predefined temperature range. As a result of temperature change, the viscosity of the fluid and therefore the flow resistance at the throttle point also change. The throttle point is now additionally widened thereby, so that, as a result of the resilient behavior, the clear cross section of the throttle point is enlarged, or a new clear cross section is established. Consequently, the pressure difference at the throttle point advantageously does not rise, in particular at low temperatures, and other components of the fluid system are not damaged.

In an advantageous configuration of the spring element according to the disclosure, the at least one spring member may be of arcuate and/or spiral-shaped configuration. This makes possible simple and rapid production of the spring member by a stamping process.

In a further advantageous configuration of the spring element according to the disclosure, selected spring characteristics and/or a selected structural shape of the basic body and/or a selected structural shape of the at least one throttle point determine the dynamic behavior of the opening cross section of the at least one throttle point and/or an actually effective spring force of the at least one spring member during pressure difference changes. For example, the basic body may include in its circumferential region a plurality of symmetrical spring arms the ends of which determine the shape and dimensions of the at least one throttle point. The throttle point may be configured in such a way that a first opening with a preferred outflow channel is predefined by two spring arms and a second opening with a wider outflow channel arranged downstream of the first opening in the fluid flow direction is predefined by two circumferential arms.

In a further advantageous configuration of the spring element according to the disclosure, the at least one spring member is formed in the central region of the disk-shaped basic body. This allows the functions combined in the spring element according to the disclosure to be performed independently of one another.

In a further advantageous configuration of the spring element according to the disclosure, at least one centering lobe for positionally correct installation of the spring element is arranged on the circumference of the basic body.

In an advantageous configuration of the piston pump according to the disclosure, the spring element is placed between two flat surfaces of the cylinder element and of the cover, making possible simple installation of the spring element. In this case the basic body of the spring element is arranged substantially with its circumferential arms between the cylinder element and the cover of the piston pump 1.

Exemplary embodiments of the disclosure are represented in the drawings and are explained in more detail in the following description. In the drawings the same reference numerals denote components and elements which perform the same or analogous functions.

BRIEF DESCRIPTION OF THE DRAWINGS

FIG. 2 is a perspective representation of an exemplary embodiment of a spring element according to the disclosure for the piston pump represented in FIG. 1.

FIG. 3 is a perspective representation of a further exemplary embodiment of a spring element according to the disclosure for the piston pump represented in FIG. 1.

DETAILED DESCRIPTION

Figure 1:
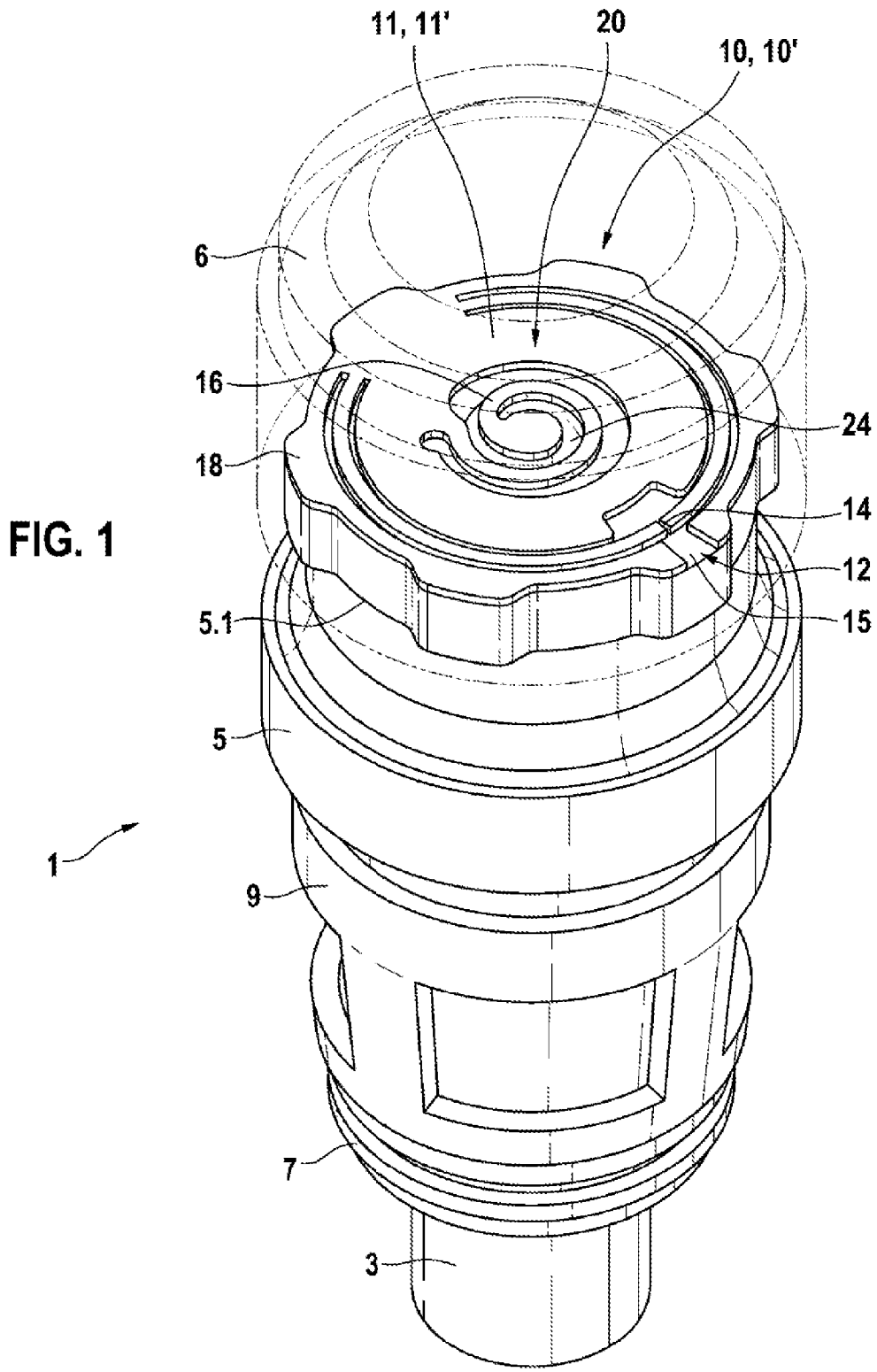
FIG. 1 is a schematic perspective representation of an exemplary embodiment of a piston pump for delivering fluids according to the disclosure.

As can be seen from FIG. 1, a piston pump 1 for delivering fluids according to the disclosure comprises a piston 3, a cylinder element 5, a sealing element 7 and a fluid filter 9 which is arranged upstream of an inlet opening (not visible), downstream of which an inlet valve (not shown) is arranged. A pressure chamber (not visible), which is closed by a cover 6 in which the outlet valve 20 is arranged, is arranged in the interior of the cylinder element 5 between the inlet valve (not shown) and the outlet valve 20. The cover 6 is represented transparently and is pressed onto a rear part of the cylinder element 5 in the form of a shoulder 5.1 in such a way that at least one fluid channel and at least one outflow opening are formed between the cover 6 and the shoulder 5.1. The piston pump 1 according to the disclosure which is represented may be arranged, for example, in a receiving bore (not shown) of a pump housing or a fluid block. Transversely disposed pressure medium channels may open into the receiving bore, through which channels fluid is directed via the fluid filter 9 to the inlet opening of the piston pump 1 and is conducted away from the at least one outflow opening of the piston pump 1.

As can further be seen from FIG. 1, the outlet valve 20 comprises a sealing seat (not visible) arranged on an outlet opening of the pressure chamber, a closing body 24 which may be configured, for example, as a ball, a cap or in another form, and a spring member 16 acting on the closing body 24. A device 12 for throttling the fluid flow, comprising a basic body 11, 11' and a throttle point 14, is provided downstream of the outlet valve 20 in the fluid flow in order to reduce noise generation. For this purpose an installation space for a spring element 10, 10', which is delimited by a flat surface on the end face of the cylinder element 5 and by a flat, inwardly-stepped surface of the cover 6, is provided between the cylinder element 5 and the cover 6. The spring element 10, 10' is placed in the cover 6, for example before the cover 6 is pressed onto the shoulder 5.1 of the cylinder element 5.

According to the disclosure, the spring element 10, 10' combines a closing spring function, for the outlet valve 20 in the exemplary embodiment shown, with a dynamic throttle function at the throttle point 14. As is apparent from FIGS. 1 to 3, the spring element 10, 10' comprises a disk-shaped basic body 11, 11' in which at least one spring member 16 is formed. The basic body 11, 11' for throttling the fluid flow 8 further comprises at least one dynamic throttle point 14 in the region of which the basic body 11, 11' is of resilient configuration, so that the opening cross section of the at least one throttle point 14 is variably adjustable as a function of a pressure difference. The spring element 10, 10' according to the disclosure therefore controls, via the closing spring function in combination with the closing body 24, the opening pressure of the outlet valve 20 which separates a compression chamber of the piston pump 1 from the high-pressure side of the associated system, and, via the dynamic throttle function, the effective cross section of the throttle point 14. The combination of the two functions in the spring element 10, 10' is preferably implemented in that a first spring effect of the spring element 10, 10' for the closing spring function acts perpendicularly to a second spring effect of the spring element 10, 10' for the throttle function. In the exemplary embodiments shown, the first spring effect of the spring element 10, 10' acts axially and the second spring effect of the spring element 10, 10' acts radially.

By virtue of the resilient configuration of the basic body 11, 11' in the region of the at least one throttle point 14, embodiments of the present disclosure are advantageously able to adapt their throttling behavior, or their opening cross section, dynamically to the prevailing pressure difference. For this purpose, the basic body 11, 11' has in the region of the at least one throttle point 14 at least one spring arm 12.1, 12.2 which determines the opening cross section and adjusts the opening cross section of the at least one throttle point 14 as a function of the pressure difference.

In the exemplary embodiment represented, the at least one throttle point 14 has a minimum opening cross section which is independent of the pressure difference and can be optimized as a function of the desired throttling behavior to a volume flow within a predefined temperature range. As a result of temperature change, the viscosity of the fluid, and therefore the flow resistance at the predefined minimum throttle cross section of the throttle point 14, also change. As a result of the resilient configuration of the basic body 11, 11' in the region of the throttle point 14, the throttle point 14 is widened, so that the clear cross section is enlarged, or a new clear cross section is established. The internal pressure of the piston pump 1 thereby advantageously does not rise, especially at low temperatures, so that other components of the piston pump 1 are not damaged. A maximum opening cross section of the throttle point 14 independent of the pressure difference may be predetermined, for example, by the existing installation space or by a stop. The dynamic behavior of the opening cross section of the at least one throttle point 14 during pressure difference changes can advantageously be determined by the selection or specification of the spring characteristics and/or of the structural shape of the basic body 11, 11' and/or of the structural shape of the at least one throttle point 14. The same applies to the spring effect of the at least one spring member 16 for implementing the closing spring function.

As is further apparent from FIGS. 1 to 3, the at least one spring member 16 is formed in the central region of the disk-shaped basic body 11, 11'. In the exemplary embodiments represented, the spring member 16 is spiral-shaped and formed with an associated opening. Alternatively, arcuate or other shapes which will seem appropriate to the person skilled in the art are possible for the implementation of the at least one spring member 16.

As is further apparent from FIGS. 1 to 3, in the embodiments represented the basic body 11, 11' of the spring elements 10, 10' each have two spring arms 12.1, 12.2 the ends of which determine the shape of the respective throttle point 14. The basic body 11, 11' of the spring element 10, 10' may be produced, for example, as a stamping.

In the exemplary embodiment represented in FIG. 2, the basic body 11 of the spring element 10 is implemented as a stamping with one throttle point 14 and a plurality of centering lobes 18 which are arranged on the basic body 11 to facilitate placement of the spring element 10. The centering lobes 18 advantageously make possible positionally correct installation of the basic body 11. As is further apparent from FIG. 2, the predefined minimum opening cross section of the throttle point 14, the shape of which is determined by two spring arms 12.1, 12.2, makes possible an increasing fluid flow 8 through the outlet channel 15 of the throttle point 14 up to a pressure difference threshold value determined by the spring behavior. If the pressure difference rises above the pressure difference threshold value, the two spring arms 12.1, 12.2 are spread apart in the directions indicated by the arrows 8.1, 8.2, so that the opening cross section of the throttle point 14 and a flow quantity Q of fluid are increased and the effective pressure difference is reduced.

As is further apparent from FIG. 2, the outflow opening 15 formed between two circumferential arms 12.3, 12.4 of the basic body 11 makes it possible to specify a maximum opening cross section of the throttle point 14, the shape of the outflow opening 15 being determined by the ends of the circumferential arms 12.3, 12.4. Furthermore, the basic body 11 is arranged substantially with its circumferential arms 12.3, 12.4 between the cylinder element 5 and the cover 6 of the piston pump 1.

In contrast to the exemplary embodiment shown in FIG. 2, the exemplary embodiment shown in FIG. 3 of the spring element 10' has a basic body 11' in the form of a stamping on which no centering lobes are arranged. As can further be seen from FIG. 3, in this embodiment, too, the predefined minimum opening cross section of the throttle point 14, the shape of which is determined by two spring arms 12.1, 12.2, makes possible an increasing fluid flow 8 through the outflow channel 15 of the throttle point 14 up to a certain pressure difference threshold value determined by the spring behavior. If the pressure difference rises above the pressure difference threshold value, the two spring arms 12.1, 12.2 are spread apart in the directions indicated by the arrows 8.1, 8.2, so that the opening cross section of the throttle point 14 and a flow quantity Q of fluid are increased and the effective pressure difference is reduced. In this embodiment, too, the outflow opening 15 formed between two circumferential arms 12.3, 12.4 of the basic body 11 makes it possible to specify a maximum opening cross section of the throttle point 14, the shape of the outflow opening 15 being determined by the ends of the circumferential arms 12.3, 12.4. Furthermore, the basic body 11' is arranged substantially with its circumferential arms 12.3, 12.4 between the cylinder element 5 and the cover 6 of the piston pump 1.

Embodiments of the present disclosure advantageously make possible very good NVH behavior (NVH: Noise, Vibration, Harshness). By means of the resilient throttle device, the pressure difference upstream and downstream of the throttle device can advantageously be maintained constant in the event of a high-viscosity state of the fluid. The drive power and the stress on the force transmitting individual parts such as bearings, piston, high-pressure sealing rings, etc., are thereby reduced. With suitable configuration, this can be exploited to save cost in future applications. In addition, as a result of the shaping of the throttle point, the throttling behavior can advantageously be adapted to function.

The invention claimed is:

1. A spring element comprising:
   a disk-shaped basic body; and
   at least one spring member formed in the basic body,
   wherein the basic body includes at least one dynamic throttle point configured to throttle a fluid flow, wherein the fluid flow is in a direction perpendicular to the disk-shaped basic body, and
   wherein the basic body has a resilient configuration to provide a first spring action in an opposite direction of the fluid flow and to provide a second spring action perpendicular to the first spring action in a region of the at least one throttle point such that an opening cross section of the at least one throttle point perpendicular to the direction of the fluid flow is variably adjustable as a function of a pressure difference.

2. The spring element as claimed in claim 1, wherein:
   the basic body has in the region of the at least one throttle point at least one spring arm configured to determine the opening cross section, and
   the spring arm is configured to adjust the opening cross section of the at least one throttle point as a function of the pressure difference.

3. The spring element as claimed in claim 1, wherein the at least one throttle point has at least one of a minimum opening cross section and a maximum opening cross section which is independent of the pressure difference.

4. The spring element as claimed in claim 1, wherein the at least one spring member has at least one of an arcuate configuration and a spiral-shaped configuration.

5. The spring element as claimed in claim 1, wherein at least one of selected spring characteristics, a selected structural shape of the basic body, and a selected structural shape of the at least one throttle point determine dynamic behavior of at least one of the opening cross section of the at least one throttle point and an actually effective spring force of the at least one spring member during pressure difference changes.

6. The spring element as claimed in claim 1, further comprising:
   two symmetrical spring arms formed in a circumferential region of the basic body,
   wherein ends of the spring arms determine a shape of the at least one throttle point.

7. The spring element as claimed in claim 1, wherein the at least one spring member is formed in a central region of the basic body.

8. The spring element as claimed in claim 1, further comprising at least one centering lobe arranged on a circumference of the basic body, the at least one centering lobe configured to enable positionally correct installation of the basic body.

9. A piston pump for delivering fluids, comprising:
   a piston;
   a cylinder element; and
   a pressure chamber arranged between an inlet valve and an outlet valve and closed by a cover, the outlet valve including a closing element configured to move against a force of a spring element and the outlet valve including a mechanism configured to throttle fluid flow, wherein the fluid flow is in a direction from the inlet valve to the outlet valve, the mechanism provided downstream of the outlet valve in the fluid flow,
   wherein the spring element of the outlet valve includes:
      a disk-shaped basic body; and
      at least one spring member formed in the basic body,
      wherein the basic body includes at least one dynamic throttle point configured to throttle a fluid flow, and
      wherein the basic body has a resilient configuration to provide a first spring action in an opposite direction of the fluid flow and to provide a second spring action perpendicular to the first spring action in a region of the at least one throttle point such that an opening cross section of the at least one throttle point perpendicular to the direction of the fluid flow is variably adjustable as a function of a pressure difference.

10. The piston pump as claimed in claim 9, wherein the spring element is arranged between a flat surface of the cylinder element and a flat surface of the cover.

* * * * *